United States Patent [19]

Butler et al.

[11] Patent Number: 4,494,985

[45] Date of Patent: Jan. 22, 1985

[54] FILTRATION OF INCLUSIONS FROM MOLTEN METAL ALLOY

[75] Inventors: Russell H. Butler, Rockaway; Edward V. Limoncelli, Morristown; Michael J. Litwinowich, Boonton; Michael L. Briggs, Budd Lake, all of N.J.

[73] Assignee: Allied Corporation, Morris Township, Morris County, N.J.

[21] Appl. No.: 456,223

[22] Filed: Jan. 7, 1983

[51] Int. Cl.$^3$ ............................................. C22B 21/06
[52] U.S. Cl. .................... 75/93 R; 75/68 R; 75/93 AC; 266/227; 210/774; 210/289
[58] Field of Search .............. 75/61, 68 R, 93 R; 266/227; 210/290, 774

[56] References Cited

U.S. PATENT DOCUMENTS

| | | | |
|---|---|---|---|
| 2,715,063 | 8/1955 | Weiss | 75/68 R |
| 3,039,864 | 6/1962 | Hess et al. | 75/67 |
| 3,737,305 | 6/1973 | Blayden et al. | 75/68 R |
| 4,142,571 | 3/1979 | Narasimhan | 164/88 |
| 4,277,280 | 7/1981 | Montgrain | 75/68 R |
| 4,334,990 | 6/1982 | du Manoir de Juaye et al. | 210/282 |
| 4,413,813 | 11/1983 | Pryor | 266/231 |

FOREIGN PATENT DOCUMENTS 678078  8/1979  U.S.S.R. ............................. 75/68 R

OTHER PUBLICATIONS

S. K. Saxena, "Kinetics of Aluminum Deoxidation of Liquid Steel" 1980, No. 6, pp. 281–286.
T. A. Engh, et al. "A Fluid Mechanical Model of Inclusion Removal" 1975, pp. 49–58.
S. K. Saxena, et al. "Mechanism of Clogging of Tundish Nozzle in Continuous Casting of Aluminum Killed Steel" May 1974.
P. Galeta, et al. "Assessment of Tundish Nozzle Blockage Mechanisms—Mathematical Modeling Approach" 1981.
The "Selee" brochure of Consolidated Aluminum distributed in 1981.
R. Mutharasan, et al. "A Laboratory Investigation of Aluminum Filtration Through Deep Bed and Ceramic Open-Pore Filters" Dec. 1981, pp. 12–17.
S. N. Singh, "Mechanism of Alumina Buildup in Tundish Nozzles During Continuous Casting of Aluminum-Killed Steels" Oct. 1974, pp. 2165–2178, vol. 5.
Consolidated Aluminum's "Selee System: Two Syllables That Could Change Your Life", 33 Metal Producing, Mar. 1978.

Primary Examiner—M. J. Andrews
Attorney, Agent, or Firm—Paul Yee; Ernest D. Buff; Gerhard H. Fuchs

[57] ABSTRACT

The invention provides a filter apparatus and method for removing inclusions from a molten metal alloy and includes a container having an inlet portion and an outlet portion. A filter bed is located within said container, interposed between said container inlet and said container outlet, and is comprised of a plurality of filter zones arranged in progressive layers. Each of the filter zones contains particles of filter material within a preselected size range, and the filter zones are successively arranged to selectively locate the largest filter particles at the container outlet and the smallest filter particles at the container inlet. Molten metal alloy is filtered by passing it through the filter bed.

13 Claims, 10 Drawing Figures

FILTRATION OF INCLUSIONS FROM MOLTEN METAL ALLOY

BACKGROUND OF THE INVENTION

1. Field of the Invention

The invention relates to an apparatus and method for filtering inclusions from molten metal alloy. More particularly, the invention relates to filtering inclusions from a molten metal alloy prior to extrusion from a planar flow casting nozzle to form solid glassy metal alloy filament.

2. Description of the Prior Art

When casting metal alloys such as aluminum and iron alloys, inclusions comprised of oxides and nonmetallic particulates can form in the melt and be held in suspension. During casting operations, the inclusions can accumulate and adhere to the walls of the casting nozzle near the outlet orifice. The accumulation can then disrupt the stream of molten metal, disrupt the geometry of the cast material and clog the casting nozzle. If the inclusions pass through the nozzle, they can degrade the properties of the cast metal. An example of this phenomena is discussed in "Mechanism of Alumina Buildup in Tundish Nozzle During Continuous Casting of Aluminum-Killed Steels" by S. N. Singh, published in *Metallurgical Transactions,* October, 1974 issue.

Filter beds of tubular alumina, alumina balls and ceramic foam sponge have been used to filter molten aluminum prior to casting, as discussed in the paper, "A Laboratory Investigation of Aluminum Filtration Through Deep Bed and Ceramic Open-Pore Filters" by R. Mutharasan, D. Apelian, and C. Romanowski, published in *Journal of Metals,* December, 1981 issue. Methods and apparatus, including casting nozzles, for casting glassy metal filament are disclosed in U.S. Pat. No. 4,142,571 for "Continuous Casting Method for Metallic Strips" issued Mar. 6, 1978 to Narasimhan.

Inclusions have been particularly troublesome when casting filaments of glassy metal alloys because the glassy metal alloys are cast at extremely high speeds, typically up to 2,200 m/min; the exit orifice of the casting extrusion nozzle is very narrow, usually about 15 to 20 mils (0.038-0.051 cm) wide; and because the cast metals are very thin, 25-100 microns in thickness. Consequently, any inclusions that collect in the casting nozzle outlet orifice will seriously degrade the cast metal. There will be unacceptable variations in the filament cross-section, and the cast filament may split and become discontinuous across its width dimension. As a result, the casting operation often becomes disrupted within a matter of minutes after starting.

Conventional filters, such as ceramic sponge filters, have randomly sized and randomly located filtering pores. Conventional filter beds are typically constructed with different size filter particles located randomly throughout the bed or constructed with progressively smaller filter particles located downstream from relatively larger filter particles. Such filters and filter beds have proven to be unsatisfactory because fine particulates released by the filter material itself migrate out of the filter, deposit onto the nozzle walls and clog the nozzle orifice. As a result, casting operations using conventional filters have had higher costs and lower yields than are considered to be acceptable.

SUMMARY OF THE INVENTION

The invention provides a filter apparatus which reliably removes inclusions from a molten metal to allow the continuous casting of metal alloys, such as glassy metal alloys. The apparatus includes a container means having an inlet portion and an outlet portion. A filter bed, located in the container means, is interposed between the container inlet and the container outlet and comprised of at least two filter zones arranged in layers. Each of the filter zones contains particles of filter material within a preselected size range, and the filter zones are successively arranged to selectively locate the largest filter particles proximate to the container outlet portion and locate the smallest filter particles relatively more proximate to the container inlet portion.

The invention also provides a method of filtering molten metal alloy. The molten metal alloy is passed into a filter bed having filter particles of selected sizes, and is successively contacted with progressively larger filter particles as the alloy flows farther through the filter bed.

The particular arrangement of filters and filter particles used in the present invention reliably removes inclusions from the melt, supports the fine filter particles needed to remove small inclusions and keeps the fine filter particles away from the nozzle orifice where they may form obstructions. Advantageously, the filter of the present invention is not only more reliable and efficient but also permits continuous casting of glassy metals for periods substantially longer than that permitted by conventional filters having randomly located filter pores or particles, or having progressively smaller filter particles located downstream from larger filter particles.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENTS

For the purposes of this invention and as used in the specification and claims, the term "filament" is a slender body whose transverse dimensions are much smaller than its length. Thus, the term filament includes wire, ribbon, sheet and the like of regular or irregular cross-section.

Figure 1:
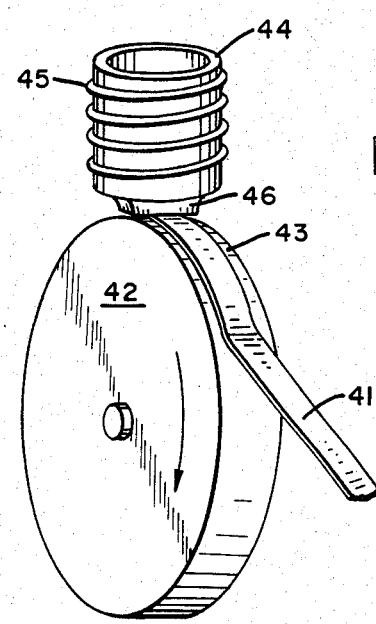
FIG. 1 shows a schematic representation of an apparatus for the continuous casting of glassy metal alloy filament.

Referring to FIG. 1 of the drawings, there is shown a representative apparatus for the continuous casting of a metal filament 41. An extrusion means is comprised of a reservoir crucible 44 and an extrusion nozzle 46. Molten alloy contained in crucible 44 is heated by a heating element 45, and pressurization of the crucible with an inert gas extrudes a molten stream through nozzle 46 located at the base of the crucible onto quench surface 43 of casting wheel 42. Such an apparatus is suitable for forming polycrystalline metal filament of aluminum, tin, copper, iron, steel, nickel, cobalt and the like. However, metal alloys, that upon rapid cooling from the metal form solid, amorphous, glassy structures are preferred. Such alloys are well known in those skilled in the art, and examples are disclosed in U.S. Pat. Nos. 3,427,154; 3,981,722 and others.

Glassy metal filament can be prepared by cooling a melt of the desired composition at a rate of at least about $10^{4°}$ C./sec., employing metal alloy quenching techniques well known to the glassy metal alloy art; see, e.g., U.S. Pat. No. 3,856,513 to Chen, et al. The purity of all compositions is that found in normal commercial practice. A variety of techniques are available for fabricating continuous ribbon. Typically, a particular composition is selected, powders or granules of the requisite elements in the desired proportions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long-range order. X-ray diffraction patterns of glassy metal alloys show only a diffuse halo, similar to that observed for inorganic oxide glasses. Such glassy alloys must be at least 50 percent glassy to be sufficiently ductile to permit subsequent handling without degradation of the magnetic characteristics. Preferably, the glassy metal must be at least 80 percent glassy to obtain superior ductility. The metastable phase may also be a solid solution to the constituent elements. The solid solution phases are not ordinarily produced under conventional processing techniques employed in the art of fabricating crystalline alloys, and x-ray diffraction patterns of the solid solution alloys show the sharp diffraction peaks characteristic of crystalline alloys, with some broadening of the peaks due to the desired fine grain size of the crystallites. Such metastable materials are also ductile when produced under the conditions described above.

Figure 2:
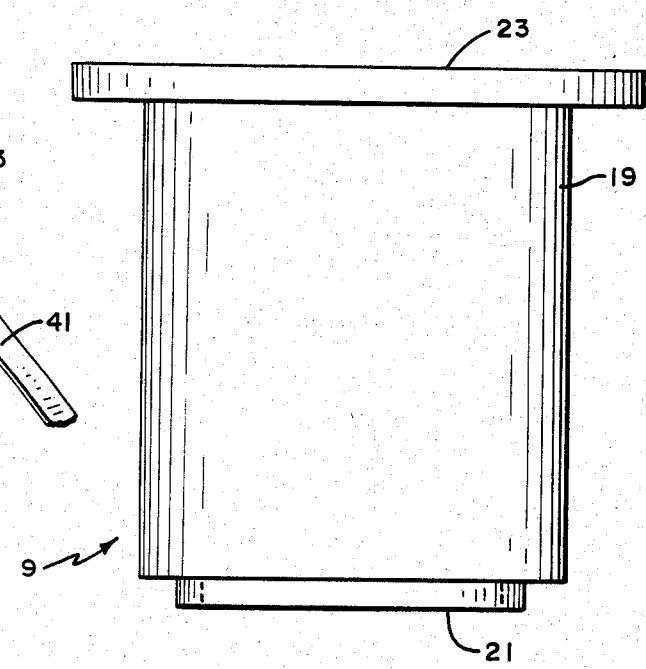
FIG. 2 shows a side elevational view of a casting nozzle used to cast glassy metal alloys.
Figure 3:
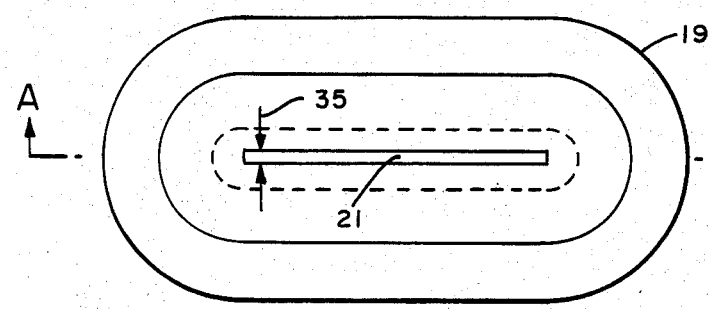
FIG. 3 shows a bottom plan view of the casting nozzle.

FIGS. 2 and 3 illustrate a representative casting nozzle shown generally at 9. Nozzle body 19 is made of a suitable refractory material, such as a clay-zirconium material, and has a nozzle inlet portion 23 and a nozzle exit orifice 21. When casting a glassy metal alloy, exit orifice 21 is preferably a slot-type orifice adapted to extrude a planar (sheet-like) stream of molten alloy. Preferably, the orifice slot width 35 ranges from about 0.038 cm to 0.051 cm, although the slot length may extend many centimeters. Nozzles with orifices over 15 cm long have been used successfully. Detailed apparatus, including casting nozzles, for casting glassy metal filament are disclosed in U.S. Pat. No. 4,142,571 for "Continuous Casting Method for Metallic Strips" issued Mar. 6, 1978 to Narasimhan, which is hereby incorporated by reference thereto.

Figure 4:
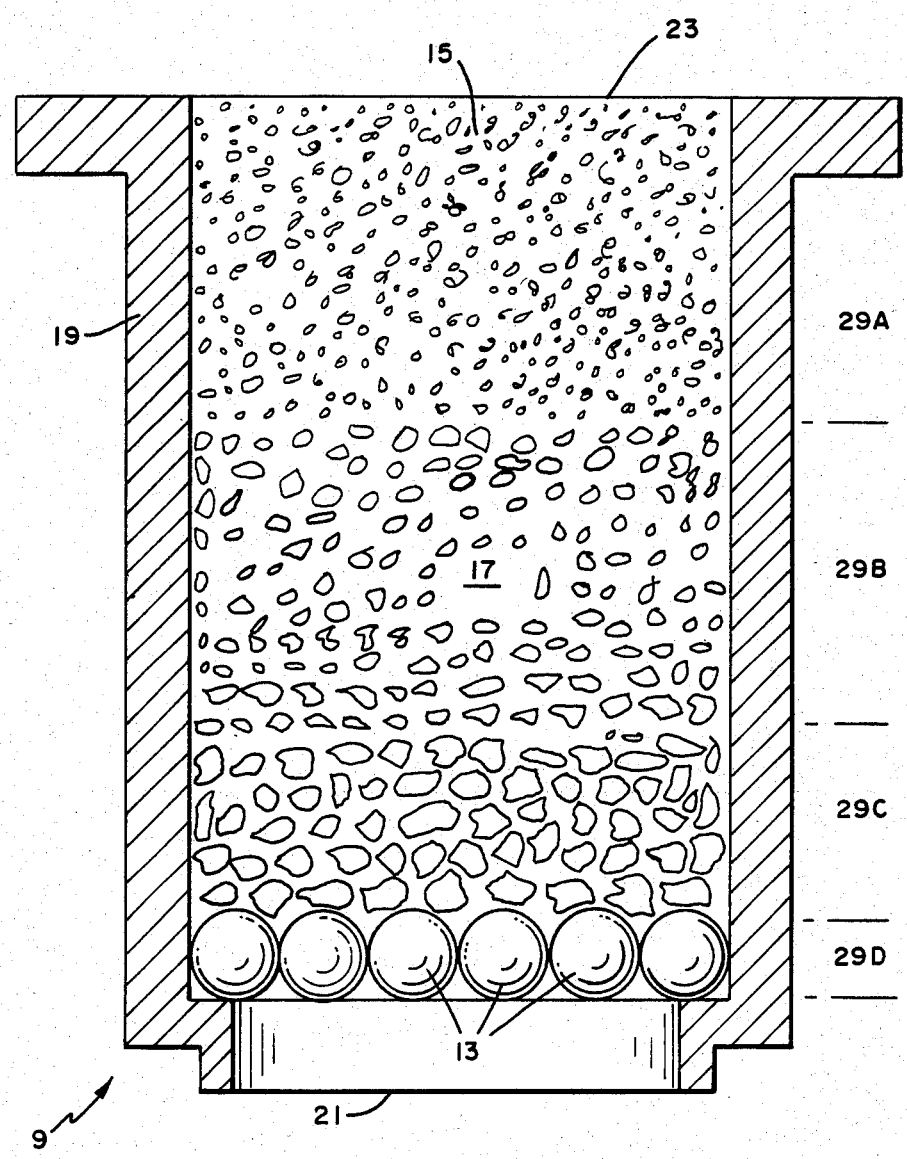
FIG. 4 shows an enlarged cross-sectional view of the casting nozzle taken along line A—A of FIG. 3.

FIG. 4 illustrates the filter apparatus of the invention incorporated into nozzle 9 to remove inclusions from a molten metal prior to casting. Nozzle body 19 provides a container means having an inlet portion, comprised of nozzle inlet 23, and an outlet portion, comprised of nozzle exit orifice 21. A filter bed 17 located within nozzle body 19 is comprised of a plurality of filter zones 29 arranged in progressive layers. Each of the filter zones contains particles 15 of filter material having a preselected size range, and the filter zones are successively arranged to selectively locate the largest filter particles proximate to the nozzle outlet portion and locate the smallest filter particles farther from the outlet and relatively more proximate to the nozzle inlet portion. Preferably, a flow stabilizer means comprised of spheroid balls 13 is located adjacent to nozzle orifice 21.

The number of filter zones 29 can vary depending upon the alloy composition, casting temperature and desired flow rate. For glassy metal alloys, the number of filter zones is typically at least 2 and preferably, ranges from about 3 to 10. The example filter apparatus of the shown embodiment has three progressively arranged filter zones 29 A, B and C. The first filter zone 29A is located at nozzle inlet 23 and is comprised of filter particles which range in size from about 0.168 cm to about 0.282 cm. The second filter zone 29B is located successive to filter zone 29A and is comprised of filter particles ranging in size from about 0.282 cm to about 0.399 cm; the third filter zone 29C is located successive to filter zone 29B and is comprised of filter particles ranging in size from about 0.318 cm to about 0.952 cm. A suitable refractory type filter material should be used to form filter particles 15. For example, the filter particles in filter zones 29 A, B and C are composed of a clay-zirconium material, such as a material about 10% (by weight) clay, 85% zircon and 5% zirconia.

The flow stabilizer means, comprised of spheroid balls 13, spaces filter bed 17 away from orifice 21, further inhibits the passage of inclusions and consolidates the flow of molten metal. As a result, there is a stable, substantially uniform flow from filter bed 17 to the orifice. The use of spheroid balls for flow stabilization is important because the spherical shape produces the required uniform and stable flow of molten metal around the particles and into orifice 21. Irregularly shaped particles located at the orifice would disrupt the desired planar flow therethrough. Additionally, it is important that the balls be held closely adjacent to the orifice with retainer means. If the spheroids are allowed to float up away from the orifice, the planar flow of molten metal will become disrupted by any irregular particles lodging in the orifice. A suitable retainer means could be a separate retainer screen, but preferably is comprised of the mass of filter particles located above the spheroids and disposed to completely and tightly fill nozzle 9. A refractory material, such as alumina, is used to form the spheroids.

Figure 8A:
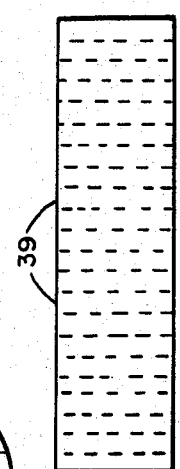
FIGS. 8A and B show, respectively, a schematic top plan view and a side elevational view of a flow straightener employed by the invention.
Figure 8B:
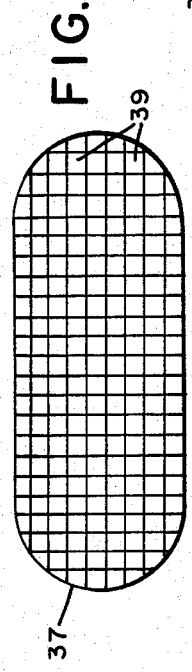

FIGS. 8A and B illustrate an alternative flow stabilizer means comprised of a filtering-type flow straightener 37. The flow straightener is composed of a refractory material, such as zirconia, and has a plurality of substantially linear, parallel channels 39 extending therethrough. The channels, which are preferably oriented in the direction of intended molten metal flow, have a generally rectangular cross-sectional shape. Other cross-sectional shapes, such as square or hexagonal shapes, however, would function equivalently. Depending on factors, such as the desired flow rate and alloy composition, the number of channels 39 can range from about 15 to 5000 channels per square inch, but preferably, ranges from about 300 to 600 channels per square inch. The flow straightener of a preferred embodiment, for example, has 413 channels per square inch, and the channels are about 1.27 cm long.

Figure 9:
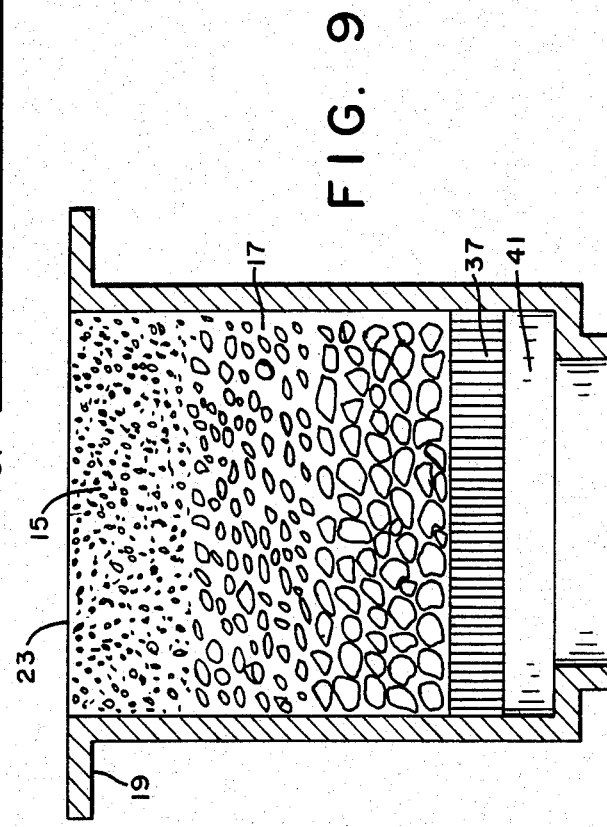
FIG. 9 shows a longitudinal cross-section of a casting nozzle employing a flow straightener.

In a preferred configuration, such as shown in FIG. 9, flow straightener 37 is spaced away from nozzle orifice 21 by a small distance of approximately 1.27 cm to provide a discrete, substantially uninterrupted free-space 41 between the flow straightener and orifice. Free-space 41 allows consolidation of the flow out from channels 39 to further facilitate establishment of a substantially planar flow through orifice 21.

To obtain additional filtration and further increase the reliability of the continuous casting operation, a preliminary filter 33 can be located upstream from filter bed 17. Preliminary filter 33 is comprised of a ceramic sponge material and filters the molten metal alloy before it is introduced into filter bed 17.

Figure 5:
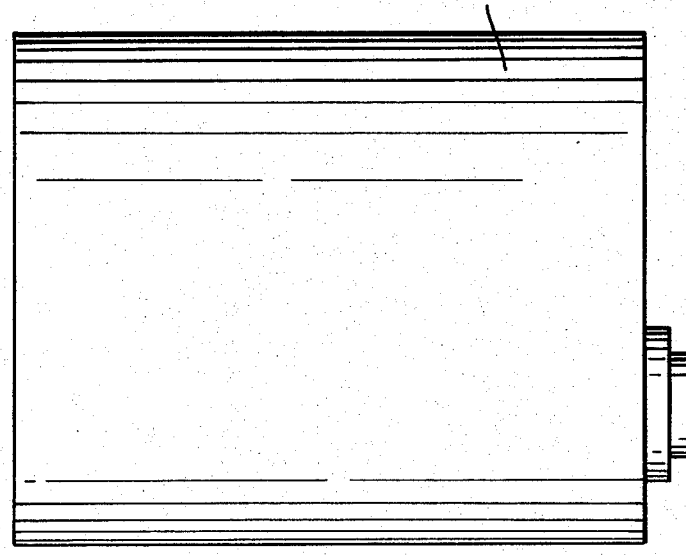
FIG. 5 shows a side elevational view of a cast cup connected to the casting nozzle.
Figure 6:
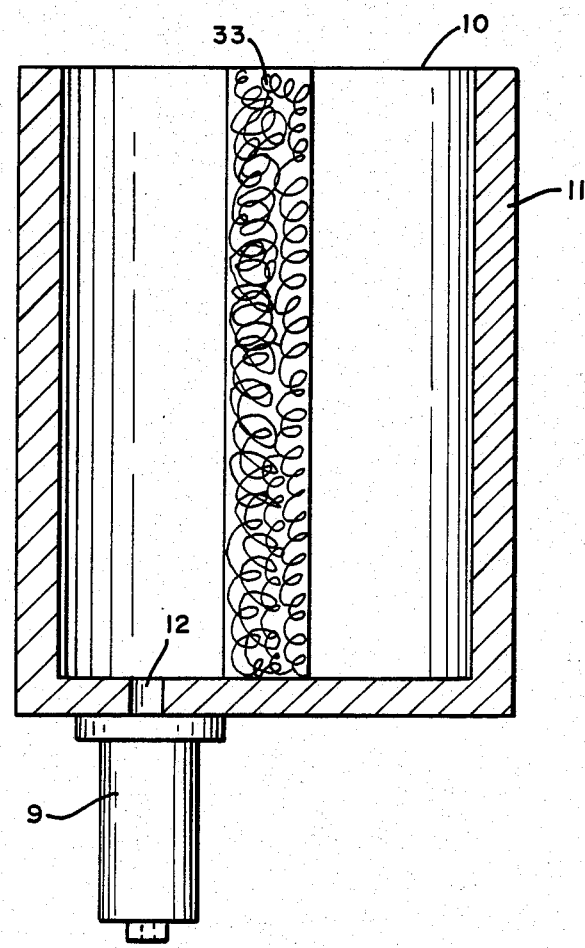
FIG. 6 shows a longitudinal cross-sectional view of the cast cup.
Figure 7:
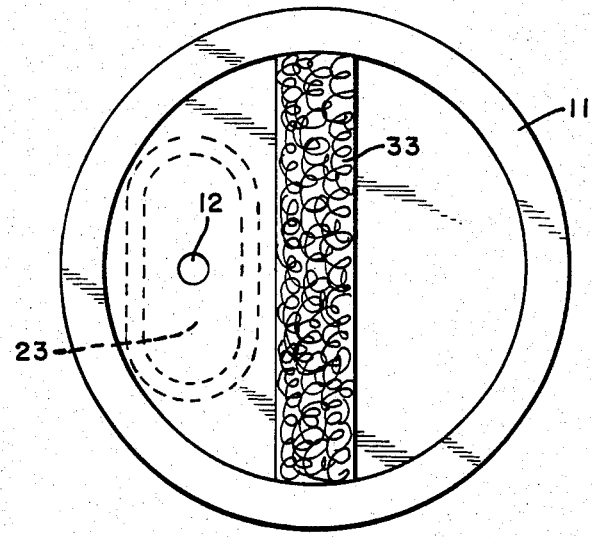
FIG. 7 shows a top plan view of the cast cup.

FIGS. 5 and 6 illustrate an embodiment where casting nozzle 9 is mounted to a reservoir, such as cast cup 11. In the shown embodiment, cast cup 11 is generally cylindrical in shape, has a cup inlet 10 and has a cup outlet 12. Preliminary filter 33 is comprised of a ceramic sponge type filter, such as a plate of ceramic foam comprised of aluminum oxide and chromium oxide. Preferably, the preliminary filter is vertically disposed across the diameter of cup 11, extends the length of the cup, and is cemented therein with a suitable refractory cement. Thus, preliminary filter 33 partitions cast cup 11 and causes the molten metal introduced into cup inlet 10 to flow through the preliminary filter prior to passing through cup outlet 12. Nozzle 9 connects to cup 11 with cup outlet 12 in fluid communication with nozzle inlet 23.

During operation, molten metal alloy is introduced into cup 11 through cup inlet 10. The molten alloy flows through preliminary filter 33 during which most inclusions are removed from the melt. After exiting cup 11 through cup outlet 12, molten alloy flows into nozzle inlet 23 and through filter bed 17 where the remaining inclusions are removed from the melt. Thereafter, the molten metal passes through the flow stabilizer and then extrudes through nozzle orifice 21 onto a suitable chilled casting surface. The filtering procedure of the invention successively contacts the molten alloy with progressively larger filter particles as it passes through filter bed 17 and has proven especially effective for preventing fine particulates, which can be generated within filter bed 17, from reaching and clogging nozzle orifice 21. Additionally, the flow stabilizer means located just upstream from the orifice effectively stabilizes the flow thereinto to preserve the planar form of the extruded molten metal stream. As a result of the effectiveness of the filter apparatus of the invention, continuous casting operations of over 6 hours have been obtained. Without the filter apparatus, casting operations typically lasted only about 4 minutes before inclusions deposited in the nozzle orifice disrupted the casting run.

Having thus described the invention in rather full detail, it will be understood that these details need not be strictly adhered to but that various and modifications may suggest themselves to one skilled in the art, all falling within the scope of the invention as defined by the subjoined claims.

We claim:

1. A filter apparatus for removing inclusions from a molten metal alloy, comprising:

(a) a nozzle body composed of a refractory material, and having an inlet portion and a slot outlet orifice portion for extruding a planar, sheet-like stream of molten metal;
   (b) a filter bed located in said nozzle body, interposed between said inlet portion and said outlet portion and comprised of at least two filter zones arranged in layers;
   (c) each of said filter zones containing filter particles which are composed of said refractory material and have a preselected size range;
   (d) said filter zones being successively and progressively arranged to selectively locate the zone having the largest filter particles proximate to said nozzle body outlet orifice portion and locate the zone having the smallest filter particles relatively more proximate to said nozzle body inlet portion; and
   (e) stabilizer means located successive to said filter bed, within said nozzle body and in proximity to said outlet slot orifice for providing a stable, substantially uniform flow from said filter bed to said outlet orifice and for providing a substantially planar flow through said slot.

2. A filter apparatus as recited in claim 1, wherein said filter bed further comprises:

(a) three progressively arranged filter zones;
   (b) the first filter zone located at the inlet of said filter container means and comprised of filter particles with sizes ranging from about 0.168 cm to about 0.282 cm;
   (c) the second filter zone located successive to the first zone and comprised of filter particles with sizes ranging from about 0.283 cm to about 0.399 cm; and
   (d) the third filter zone located successive to the second and comprised of filter particles with sizes ranging from about 0.400 cm to about 0.952 cm.

3. A filter apparatus as recited in claim 2, wherein the filter particles in said first, second and third filter zones are comprised of a clay-zirconium material.

4. A filter apparatus as recited in claim 1, wherein said flow stabilizer means is comprised of a plurality of substantially spherical balls located adjacent to said container orifice.

5. A filter apparatus as recited in claim 1, wherein said flow stabilizer means comprises a flow straightener spaced from said slot orifice and having a plurality of substantially linear parallel channels extending therethrough in the direction of intended flow.

6. A filter apparatus as recited in claim 1, further comprising a preliminary filter located upstream from said filter bed and comprised of a ceramic sponge material, which filters such molten metal alloy before it is introduced into said filter bed.

7. A filter apparatus for removing inclusions from a molten metal alloy comprising:

(a) a reservoir having an inlet portion and an outlet portion which are adapt to pass said molten metal alloy therethrough;
   (b) a preliminary filter located in said reservoir and adapted to partition said reservoir to cause the molten metal introduced into said reservoir inlet to flow through said preliminary filter prior to passing through said reservoir outlet;
   (c) a nozzle body composed of a refractory material, and having an inlet portion in fluid communication with said reservoir and an exit orifice slot adapted to extrude a planar stream of molten metal alloy;

(d) a filter bed disposed within said nozzle body between said inlet and said exit, and comprised of three progressively arranged filter zones having filter particles composed of said refractory material;

(e) the first filter zone located at said nozzle inlet and comprised of filter particles with sizes ranging from about 0.168 cm to about 0.282 cm;

(f) the second filter zone located successive to the first filter zone and comprised of filter particles with sizes ranging from about 0.283 cm to about 0.399 cm;

(g) the third filter zone located successive to the second zone proximate to said outlet orifice, and comprised of filter particles with sizes ranging from about 0.400 cm to about 0.952 cm; and (h) flow stabilizer means located successive to said filter bed, within said container and in proximity to said exit orifice slot for providing a stable, substantially uniform flow from said filter bed to said slot and for providing a substantially planar flow through said slot.

8. A filter apparatus as recited in claim 7, wherein said flow stabilizer means is comprised of a plurality of substantially spherical balls located adjacent to said orifice slot.

9. A filter apparatus as recited in claim 7, wherein said flow stabilizer means is comprised of a flow straightener having a plurality of substantially linear, parallel channels extending therethrough in the direction of intended flow and located in spaced relation from said orifice slot.

10. A filtering method for removing inclusions from a molten metal alloy, comprising the steps of:

(a) locating a filter bed within a nozzle body, which is composed of a refractory material and has a slot outlet orifice located in proximity to said filter bed;

(b) passing said molten alloy through said filter bed to contact filter particles composed of said refractory material;

(c) successively contacting said alloy with progressively larger filter particles as the alloy flows farther through the filter bed; and (d) stabilizing the flow of molten metal from said filter bed with stabilizer means located within said container means to provide a substantially planar flow through said slot.

11. A filtering method as recited in claim 10, further comprising the steps of:

(a) locating a ceramic sponge preliminary filter upstream from said filter bed; and (b) passing said molten metal alloy through said preliminary filter prior to passing said molten metal alloy through said filter bed.

12. A method as recited in claim 10, wherein said filter bed is comprised of three progressively arranged filter zones;

the first filter zone located at said nozzle inlet and comprised of filter particles with sizes ranging from about 0.168 cm to about 0.282 cm;

the second filter zone located successive to the first filter zone and comprised of filter particles with sizes ranging from about 0.283 cm to about 0.399 cm; and the third filter zone located successive to the second zone proximate to said outlet orifice, and comprised of filter particles with sizes ranging from about 0.400 cm to about 0.952 cm.

13. A method as recited in claim 11, wherein said filter bed is comprised of three progressively arranged filter the first filter zone located at said nozzle inlet and comprised of filter particles with sizes ranging from about 0.168 cm to about 0.282 cm;

the second filter zone located successive to the first filter zone and comprised of filter particles with sizes ranging from about 0.283 cm to about 0.399; and the third filter zone located successive to the second zone proximate to said outlet orifice, and comprised of filter particles with sizes ranging from about 0.400 cm to about 0.952 cm.

* * * * *